April 9, 1935.  G. A. LYON  1,997,180
TIRE COVER CONSTRUCTION
Filed March 2, 1931
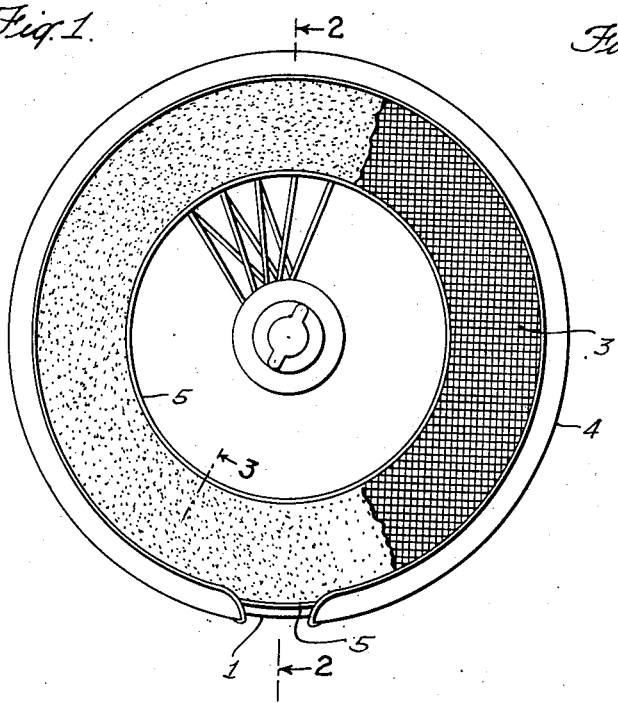
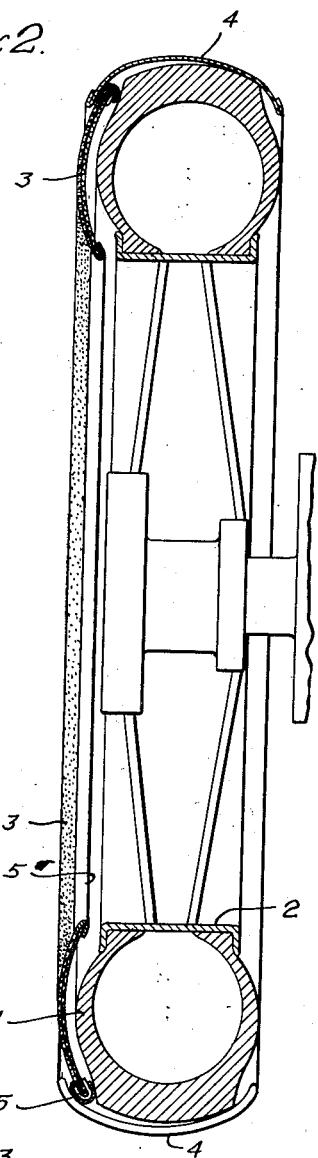
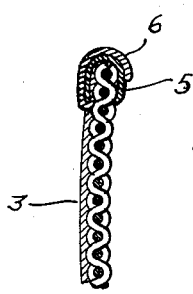
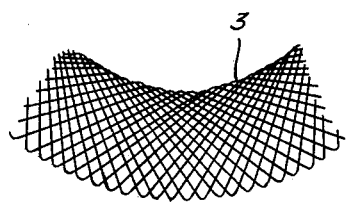
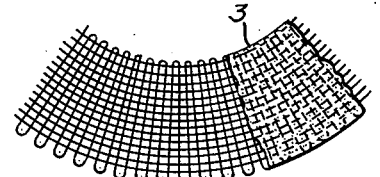
INVENTOR
GEORGE ALBERT LYON
BY Charles K. Hill
ATTORNEYS Patented Apr. 9, 1935

1,997,180

UNITED STATES PATENT OFFICE 1,997,180

TIRE COVER CONSTRUCTION

George Albert Lyon, Allenhurst, N. J., assignor to Lyon Incorporated, Asbury Park, N. J., a corporation of Delaware Application March 2, 1931, Serial No. 519,342

5 Claims. (Cl. 150—54)

This invention relates to covers for the spare tires of automobiles, and more particularly to covers of the type comprising an enclosing casing made of metal or other relatively stiff material.

In the use of tire covers of the above type, the tire enclosing casing is often dented or bent by contact of the parts of another car therewith, or by other accidental contacts. This denting or bending of the casing which usually occurs on the portion of the casing extending over one side of the tire, gives an unsightly appearance to the cover and constitutes an objection to covers of this type. A cover applied to a tire supported on a tire carrier at the rear of a car is especially liable to be struck by another car and bent out of shape.

The principal objects of the present invention are to improve the construction of tire covers of the above type and to produce a cover in which dents or bends therein may be quickly and easily removed.

With the above objects in view, the invention comprises the novel and improved features, constructions and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the construction therein shown.

In the drawing, Fig. 1 is a view in side elevation illustrating a construction embodying the invention;

Fig. 2 is a sectional view taken substantially on the line 2—2 of Fig. 1.

Fig. 3 is a detail sectional view of the side cover section taken substantially on the line 3 of Fig. 1;

Fig. 4 is a detail view in side elevation illustrating a portion of a side cover of different construction from that shown in Fig. 1; and Fig. 5 is a view similar to Fig. 4 illustrating a still different construction of side cover.

The tire cover shown in the drawing is applied to a tire 1 supported on a rim 2. In the construction shown, the cover comprises a side cover section 3 arranged to cover one side of a tire and a peripheral cover section 4 arranged to cover the peripheral portion of the tire.

The side cover section consists of an annular member arranged to extend from the tread portion of a tire inwardly toward the axis of the tire over the side wall substantially to points opposite the bead. This section, if desired, may be formed to extend substantially from the tread of the tire to the axis of the tire and rim. The said section is concavo-convex in cross section and is applied to one side of the tire with its concave side adjacent the tire, the convex side wall of the tire fitting into the recess in the adjacent side of said section as clearly shown in Fig. 2.

The body of the side section is made of interwoven strands, preferably of metal, forming a screen. The strands of the screen may consist of thin metallic strips or of wires of any desired cross section. The strands are covered with a coating of material, such as japan or lacquer forming a tough flexible film. This material not only covers the strands, but extends across the openings between the same in the form of a thin web.

The side section is reinforced upon its inner and outer margins by strips 5, preferably of sheet metal. These strips are bent into annular form and into U-shape in cross section, and are applied to the interwoven strands or screen of the side section with the respective margins of the screen engaging in the space between the sides of a strip. The sides of the strip are then pressed firmly into contact with the screen and may be secured in place by solder.

The screen of either side cover section may be cut from a piece of screen of an ordinary type now in commercial use, or it may be especially woven for the manufacture of such covers.

The strands of the side cover may be interwoven in various ways. In the construction shown in Fig. 1, the strands are arranged perpendicular to each other, as in the ordinary wire screen. The screen of the section may be cut from a piece of such ordinary screen and moulded into the desired cross-sectional shape. In the construction shown in Fig. 3, the screen of the side section is formed by long strands or wires extending back and forth obliquely between the inner and outer margins of the section, each strand having a relatively sharp angular bend at each margin of the section. In the construction shown in Fig. 5, the screen of a section is formed by a strand or series of strands extending substantially concentrically about the axis of the section, and a strand or series of strands extending back and forth substantially radially of the section. The interwoven strands may be arranged in any other desired manner in the screen material of the section.

The peripheral cover member 4 consists of an annular strip of relatively stiff sheet material, preferably sheet metal, having a concavo-convex form in cross section and arranged to fit over the periphery of a tire and to overlap the side section upon the outside thereof, the tread of the tire fitting into the recess in the inside of said section as shown in Fig. 2. The peripheral section preferably is made in the form of a split ring and is arranged to be expanded in applying the same to, or in removing the same from a tire. Upon being applied over the periphery of a tire, the peripheral section contracts by its own resilience, and grips the tire and the side cover section to hold itself and the side cover section in place on the tire. At the outer margin, the side section 3 is provided with a pad 6 of yielding material secured to the margin of the section and arranged to be engaged by the overlapping margin of the peripheral section 4 to prevent contact between the metallic parts of the two sections.

With the above construction of the side cover section, when said section is dented or bent, the dents or bends may be readily removed by simple manual operations, after the cover is removed from the tire. The screen formed by the interwoven strands may readily be restored to its original cross-sectional form and the flexible coating applied thereto readily flexes with the screen.

The present tire cover construction is highly attractive in appearance and may be quickly and easily applied to a tire. The flexible coating of the side cover may be made in any desired color matching or contrasting with the color of the car.

It is to be understood that the invention is not limited to the particular construction and arrangement of parts of the illustrated embodiment of the invention but that the invention may be embodied in other forms within the scope of the claims.

Having explained the nature and object of the invention and having specifically described a construction embodying the invention in its preferred form, what is claimed is:

1. In a tire cover construction, a yieldable casing of curved transverse cross-section and comprising interwoven metallic strands and a coating of flexible material covering the strands and extending across the openings between the same.

2. In a tire cover construction, a yieldable casing comprising interwoven strands of relatively stiff material and a coating of flexible material covering the strands and extending across in the openings between the same said casing being rendered readily flexible by the material comprising the same.

3. A tire cover construction, comprising an annular yieldable side cover section made of interwoven metallic strands having a coating of flexible material covering the strands and extending across the openings between the same, strips of sheet metal respectively for reenforcing the inner and outer margins of said section and an annular peripheral cover section of sheet metal arranged to extend about the periphery of the tire and to overlap the side cover section on the outside thereof.

4. As an article of manufacture a spare tire cover comprising a pliable casing having a woven wire base and a flexible coating therefor, whereby said casing, after being dented or bent may be readily restored to the desired shape, and relatively stiff strips commensurate with an enclosing the inner and outer margins of said casing to reinforce the same.

5. As an article of manufacture, a spare tire cover including a side portion of curved concave cross-section so as to conform generally with the outer contour of the side wall of a spare tire and being made of reinforced strand material of sufficient stiffness to retain its shape and yet being of a highly flexible character so as to enable said portion upon being bent or dented to be readily and manually flexed back to its original shape.

GEORGE ALBERT LYON.